US008625481B2

(12) United States Patent
Duggi et al.

(10) Patent No.: US 8,625,481 B2
(45) Date of Patent: Jan. 7, 2014

(54) ARCHITECTURE FOR MANET OVER BLUETOOTH

(75) Inventors: Mohan Reddy Duggi, Garland, TX (US); Niranjan, Richardson, TX (US); Guoxin Fan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1312 days.

(21) Appl. No.: 11/760,123

(22) Filed: Jun. 8, 2007

(65) Prior Publication Data

US 2008/0144566 A1 Jun. 19, 2008

Related U.S. Application Data

(60) Provisional application No. 60/870,316, filed on Dec. 15, 2006.

(51) Int. Cl.
*H04W 4/00* (2009.01)
(52) U.S. Cl.
USPC ............................ 370/328; 370/401; 455/41.2
(58) Field of Classification Search
USPC .......... 455/41.2; 370/328, 401, 338, 235, 400
See application file for complete search history.

(56) References Cited

U.S. PATENT DOCUMENTS

| | | | |
|---|---|---|---|
| 6,542,516 B1 * | 4/2003 | Vialen et al. ................... | 370/465 |
| 6,574,223 B1 * | 6/2003 | Brueckheimer et al. ... | 370/395.6 |
| 7,436,789 B2 * | 10/2008 | Caliskan et al. ........... | 370/310.1 |
| 8,234,387 B2 * | 7/2012 | Bradley et al. ................ | 709/229 |
| 2002/0012329 A1 * | 1/2002 | Atkinson et al. .............. | 370/330 |
| 2004/0167988 A1 * | 8/2004 | Rune et al. ..................... | 709/238 |
| 2005/0063416 A1 * | 3/2005 | Shin et al. ..................... | 370/465 |
| 2005/0088980 A1 * | 4/2005 | Olkkonen et al. ............ | 370/255 |

OTHER PUBLICATIONS

Niranjan; "Automatic Discovery and Connectivity Protocol for Bluetooth Scatternet Formation"; U.S. Appl. No. 11/770,519, filed Jun. 28, 2007; Specification 38 pgs.; 20 Drawing Sheets (Figs. 1-21).
Niranjan; "Application Design Framework for MANET over Bluetooth"; U.S. Appl. No. 11/831,344, filed Jul. 31, 2007; Specification 20 pgs.; 4 Drawing Sheets (Figs. 1-5).
European Search Report dated Dec. 7, 2012 in connection with European Application 08157754.6, 3 pages.
Antti Vaha-Sipila et al.: "BT-Crowds: Crowds-style anonymity with Bluetooth and Java", Proceedings of the 38th Hawaii International Conference on System Sciences, Jan. 3, 2005, pp. 1-11.
Gray Girling, et al.: "The Design and Implementation of a Low Power Ad Hoc Protocol Stack", Wireless Communications and Networking Conference, 2000, WCNC, 2000 IEEE Sep. 23-28, 2000, Piscataway, NJ, vol. 3, pp. 1521-1529.

* cited by examiner

*Primary Examiner* — Nay A Maung
*Assistant Examiner* — Angelica M Perez

(57) ABSTRACT

A mobile ad hoc network (MANET) device is provided. The device has an architecture comprising a Bluetooth adaptation layer for wireless communication according to a Bluetooth convention, a MANET service layer, a scatternet module, a routing module, and a flow control manager in the MANET service layer. The scatternet module and the routing module are in communication with the MANET service layer. The MANET service layer is independent of the topology protocol of the scatternet module and independent of a routing rules of the routing module.

20 Claims, 4 Drawing Sheets

ARCHITECTURE FOR MANET OVER BLUETOOTH

CROSS-REFERENCE TO RELATED APPLICATIONS

This application claims priority to U.S. Provisional Patent Application No. 60/870,316, entitled "Architecture for MANET over Bluetooth", filed on Dec. 15, 2006, by Niranjan, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional local area networks (LANs) typically have a central server that acts as a controller and coordinator for data traffic among the clients in the network. Communication between clients in a traditional LAN typically does not occur directly from one client to another. Instead, data might be sent from a client to the server and then from the server to another client. The server might also handle the logging in of clients, the synchronization of the activities of the clients, and other centralized control functions.

SUMMARY

In one embodiment, a mobile ad hoc network (MANET) device is provided. The device has an architecture comprising a Bluetooth adaptation layer for wireless communication according to a Bluetooth convention, a MANET service layer, a scatternet module, a routing module, and a flow control manager in the MANET service layer. The scatternet module and the routing module are in communication with the MANET service layer. The MANET service layer is independent of the topology protocol of the scatternet module and independent of a routing rules of the routing module.

In another embodiment, a method for MANET over Bluetooth is provided. The method includes providing a Bluetooth adaptation layer for wireless communication according to a Bluetooth standard, providing a MANET service layer coupled to communicate with the Bluetooth adaptation layer, and providing a scatternet module and a routing module in communication with but independent from the MANET service layer.

In another embodiment, a device for establishing a MANET using a Bluetooth communications standard is provided. The device includes a Bluetooth host stack, a Bluetooth adaptation layer, a MANET service layer, a scatternet module, and a routing module. The Bluetooth host stack is operable to implement the Bluetooth communications standard and send the Bluetooth-based data to the Bluetooth adaptation layer. The Bluetooth adaptation layer is operable to receive the Bluetooth-based data, convert the Bluetooth-based data into a format recognizable by the MANET service layer, convert the converted Bluetooth-based data into an event recognizable by the MANET service layer, and send the event to the MANET service layer. The MANET service layer promotes managing and storing the event.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A mobile ad hoc network (MANET) can be defined as a group of wireless computing devices capable of communicating directly with one another without a server acting as a central coordinator or scheduler for the data traffic between the devices. A MANET typically comprises a plurality of wireless devices such as laptop computers, handheld computers, mobile phones or mobile handsets, personal digital assistants, and similar devices. The devices might be capable of communicating with one another via any of several well known wireless data transfer protocols. A MANET in which the wireless devices communicate with one another via the Bluetooth protocol is known as a piconet and a group of connected piconets is known as a scatternet.

Other wireless networks, such as WiFi or WiMAX networks, are connectionless, meaning that devices in such networks broadcast data without regard to which other devices might receive the data. A scatternet, on the other hand, is connection-oriented, meaning that a device must establish a connection with another device before the two devices can exchange data. Three challenges can arise in the establishment and maintenance of a scatternet. First, a connection topology typically needs to be formed to establish which devices are connected to which other devices. Second, the paths over which data will be transmitted through the connection topology typically need to be determined. Third, the flow of data through the connection topology might be monitored and/or controlled.

In an embodiment, a software architecture for establishing and maintaining a scatternet is provided. The architecture provides a module for forming a connection topology for a scatternet and a module for routing data in a scatternet. Management of data flow in a scatternet is also provided. Components in the architecture are arranged in a layered, modular framework that allows the components to function independently of one another and to be replaced without significantly impacting other components. Bluetooth devices, which traditionally communicate in a one-hop fashion with a single other device, can communicate through a topology established by this architecture with multiple other Bluetooth devices.

Figure 1:
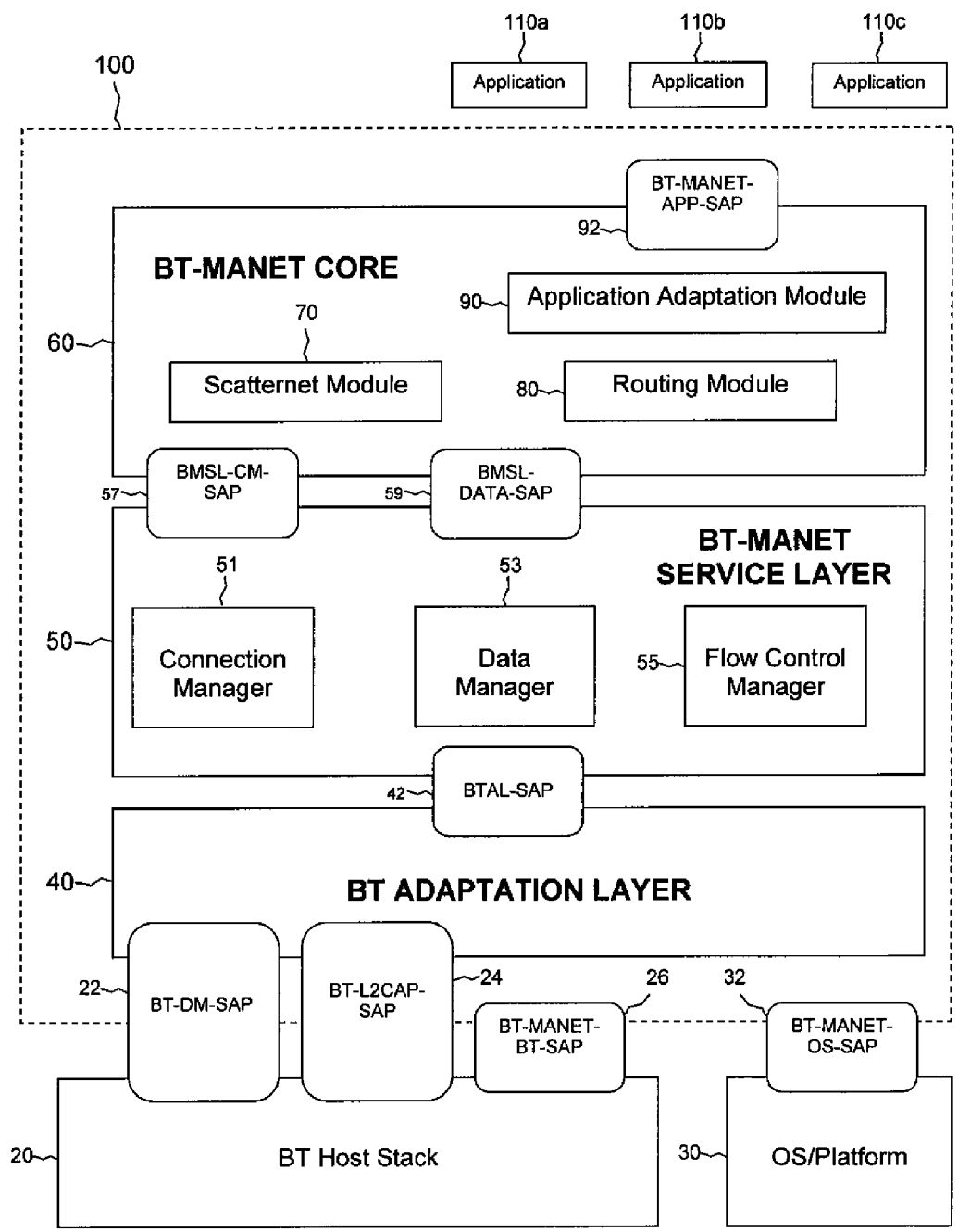
FIG. 1 is a diagram of an architecture for a MANET over Bluetooth according to an embodiment of the disclosure.

FIG. 1 illustrates an embodiment of an architecture 10 for scatternet formation and maintenance. The architecture 10 includes a Bluetooth (BT) host stack 20, an OS/platform 30, a Bluetooth (BT) adaptation layer 40, a Bluetooth MANET (BT-MANET) service layer 50, and a Bluetooth MANET (BT-MANET) core 60. The BT-MANET service layer 50 includes a connection manager 51, a data manager 53, and a flow control manager 55. The BT-MANET core 60 includes a scatternet module 70, a routing module 80, and an application adaptation module 90. The BT adaptation layer 40, the BT-MANET service layer 50, and the BT-MANET core 60 collectively comprise an overall BT-MANET solution 100.

The Bluetooth host stack 20 might be a commercial, off-the-shelf component that implements the Bluetooth communications standards. Providers of the Bluetooth host stack 20 might implement the component in hardware, firmware, software, or any combination thereof. The Bluetooth host stack 20 can be considered the component that is responsible for the transmission and reception of data between Bluetooth-capable devices. The OS/platform 30 might be a commercial, off-the-shelf operating system and/or platform used by a device in which the architecture is installed.

The BT adaptation layer 40 handles interprocess communications between the BT host stack 20 and the BT-MANET service layer 50. That is, the BT adaptation layer 40 is capable of receiving data in the format used by the BT host stack 20 and converting the data into a format usable by the BT-MANET service layer 50. This abstraction of Bluetooth dependencies provides a generic Bluetooth application programming interface to the BT-MANET service layer 50 and allows easy substitution of different BT host stacks 20 from different manufacturers. The BT adaptation layer 40 can be implemented using a Bluetooth application programming interface provided by the BT host stack 20. Therefore, the BT adaptation layer 40 may need to be replaced or modified when a different implementation of the BT host stack 20 is used.

The BT-MANET service layer 50 stores information about the active connections among the devices in a scatternet. Information regarding the roles of those devices, that is, which devices are acting as masters and which devices are acting as slaves, is also retained in the BT-MANET service layer 50. The BT-MANET service layer 50 also stores state information for the devices in a scatternet or attempting to enter a scatternet. This information can be used by the scatternet module 70 and the routing module 80 to create a connection topology and establish the routing for data in a scatternet.

When a new device connects to a scatternet, the BT host stack 20, via the BT adaptation layer 40, informs the BT-MANET service layer 50 of the new connection by sending a connection indication to the BT-MANET service layer 50. Upon receiving the connection indication, the BT-MANET service layer 50 performs a role discovery procedure on the new device to determine whether the new device is a master or a slave. The BT-MANET service layer 50 then stores this role information for use by the scatternet module 70 and the routing module 80.

The BT-MANET service layer 50 also provides a mapping between a device's Bluetooth Media Access Control (MAC) address and the connection handlers in any applications that might need to communicate with that device. This allows the applications on one device to communicate via Bluetooth with similar applications on another device.

In an embodiment, the BT-MANET service layer 50 also manages data packet handling procedures wherein certain application threads can be placed in a blocked, unblocked, or best effort status and manages multiplexing/demultiplexing procedures for the data exchanged between applications. Examples of appropriate data packet handling procedures and multiplexing/demultiplexing procedures can be found in U.S. provisional patent application No. 60/913,641, filed Apr. 24, 2007, entitled "Application Design Framework for MANET over Bluetooth", which is herein incorporated by reference for all purposes.

In an embodiment, connection-related functions in the BT-MANET service layer 50 are performed by the connection manager 51 and data-related functions are performed by the data manager 53. The decoupling of the connection-related functions and the data-related functions in this manner provides flexibility and allows different connection managers 51 and data managers 53 to be easily substituted in the BT-MANET service layer 50.

The flow control manager 55 controls the flow of data in a scatternet on a hop-by-hop basis. For example, the flow control manager 55 might monitor data flow in a scatternet and redirect data when inefficiencies in the flow are found. The flow control manager 55 can act independently of the other components in the architecture 10. Therefore, various different flow control protocols and techniques, which are well known to those skilled in the art, may be preferred for use in the present system depending on the circumstances. In some embodiments, the decoupled configuration of the flow control manager 55 relative to the other components of the architecture 10 provides the flexibility to efficiently use different flow control protocols or change flow control protocols without impacting the remaining architecture 10. For example, a first flow control manager 55 might be used in a first implementation of the architecture 10 and a second flow control manager 55 might be used in a second implementation of the architecture 10.

The scatternet module 70 forms a connection topology for the devices in a scatternet. That is, the scatternet module 70 determines which devices will form connections with other devices, how many hops away the devices will be from one another, and which devices will be masters and which devices will be slaves. The scatternet module 70 can store information about the topology it has formed in the BT-MANET service layer 50 for use by the routing module 80. An example of a connection topology procedure that could be used by the scatternet module 70 can be found in U.S. provisional patent application No. 60/913,630, filed Apr. 24, 2007, entitled "Automatic Discovery and Connectivity Protocol for Bluetooth Scatternet Formation", which is herein incorporated by reference for all purposes.

The present architecture 10 provides the scatternet module 70 as a separate module decoupled from the BT-MANET service layer 50. The scatternet module 70 may be thought of as a generic module, since any protocol with any unique features may be used in its place without impacting the remaining components of the present architecture. Therefore, the present configuration allows the scatternet module 70 to be readily replaced, for example if a more efficient, improved, or more widely accepted protocol comes along, without impacting other portions of the system. For example, a first scatternet module 70 might communicate with the BT-MANET service layer 50 in a first implementation of the architecture 10 and a second scatternet module 70 might communicate with the BT-MANET service layer 50 in a second implementation of the architecture 10.

The routing module 80 determines the paths that data packets will take when being exchanged between devices in a scatternet. After the scatternet module 70 has formed a connection topology for the devices and stored information about the topology in the BT-MANET service layer 50, the routing module 80 can retrieve the information. The routing module 80 can then determine an efficient path for data through the topology. The scatternet module 70 and the routing module 80 can act independently of one another, allowing either of these modules to be easily replaced without significantly impacting the remaining architecture components. This allows different routing protocols to be employed without impacting the overall architecture, since different routing techniques may be available and preferred depending upon, for example, the deployment environment. For example, a first routing module 80 might communicate with the BT-MANET service layer 50 in a first implementation of the architecture 10 and a second routing module 80 might communicate with the BT-MANET service layer 50 in a second implementation of the architecture 10.

The application adaptation module 90 might contain application programming interfaces or similar interfaces that allow interaction between the BT-MANET solution 100 and one or more external applications 110. Multiple instances of the application adaptation module 90 might be present for different types of applications. For example, one set of interfaces might deal with File Transfer Protocol-related applications, another set of interfaces might deal with Transmission Control Protocol/Internet Protocol-related applications, and so on.

The applications 110 might provide device users with functions that are typically found on mobile devices, such as chat functions and data transfer functions. Chat, data transfer, and other functions might also be combined into a single one of the applications 110. The applications 110 might be designed specifically for the BT-MANET solution 100 or the application adaptation module 90 might include interfaces that allow previously existing applications 110 to be ported to the BT-MANET solution 100.

The above-referenced U.S. provisional patent application, "Application Design Framework for MANET over Bluetooth", describes an application design framework that could be used for the applications 110. In this design framework, each of the applications 110 can include independent modules capable of exchanging a particular type of data or event with a corresponding module in a corresponding application on a different device. For example, one module might handle chat-related data and another module might handle data transfer events. Corresponding modules register with one another to specify the types of events that they will generate and listen for. When such an application design framework is in place, the BT-MANET service layer 50 can maintain a list of events that the modules can register for and the applications 110 can consult this list when registering for events.

In an embodiment, appropriate interfaces might exist between the layers of the MANET over Bluetooth architecture 10 to allow communication between the different layers. For example, standard Bluetooth interfaces may be present between the BT host stack 20 and the BT adaptation layer 40. A device management service access point, BT-DM-SAP 22, might mediate device-related communications between the BT host stack 20 and the BT adaptation layer 40. A logical link controller and adaptation protocol service access point, BT-L2CAP-SAP 24, might mediate connection-related communication between the BT host stack 20 and the BT adaptation layer 40. A BT-MANET-BT-SAP 26 interface may be present between the BT host stack 20 and the BT MANET solution 100 and a BT-MANET-OS-SAP 32 interface may be present between the OS/platform 30 and the BT MANET solution 100.

A BT adaptation layer service access point, BTAL-SAP 42, might act as an interface between the BT adaptation layer 40 and the BT-MANET service layer 50. The BTAL-SAP 42 might handle indications of events received from the BT host stack 20 such as indications of the connection or disconnection of devices, indications of the discovery of devices, indications of the switching of roles, and indications of link quality. The BTAL-SAP 42 might decouple such events from the Bluetooth host stack 20 by converting the events into events recognizable by the BT-MANET service layer 50. The BTAL-SAP 42 might also initialize and configure Bluetooth parameters and settings.

Between the BT-MANET service layer 50 and the BT-MANET core 60, a BT-MANET service layer connection manager service access point, BMSL-CM-SAP 57, might handle connection-related communications and a BT-MANET service layer data service access point, BMSL-DATA-SAP 59, might handle data-related communications. A BT-MANET application service access point, BT-MANET-APP-SAP 92, might act as an interface between the BT-MANET core 60 and the applications 110.

Figure 2:
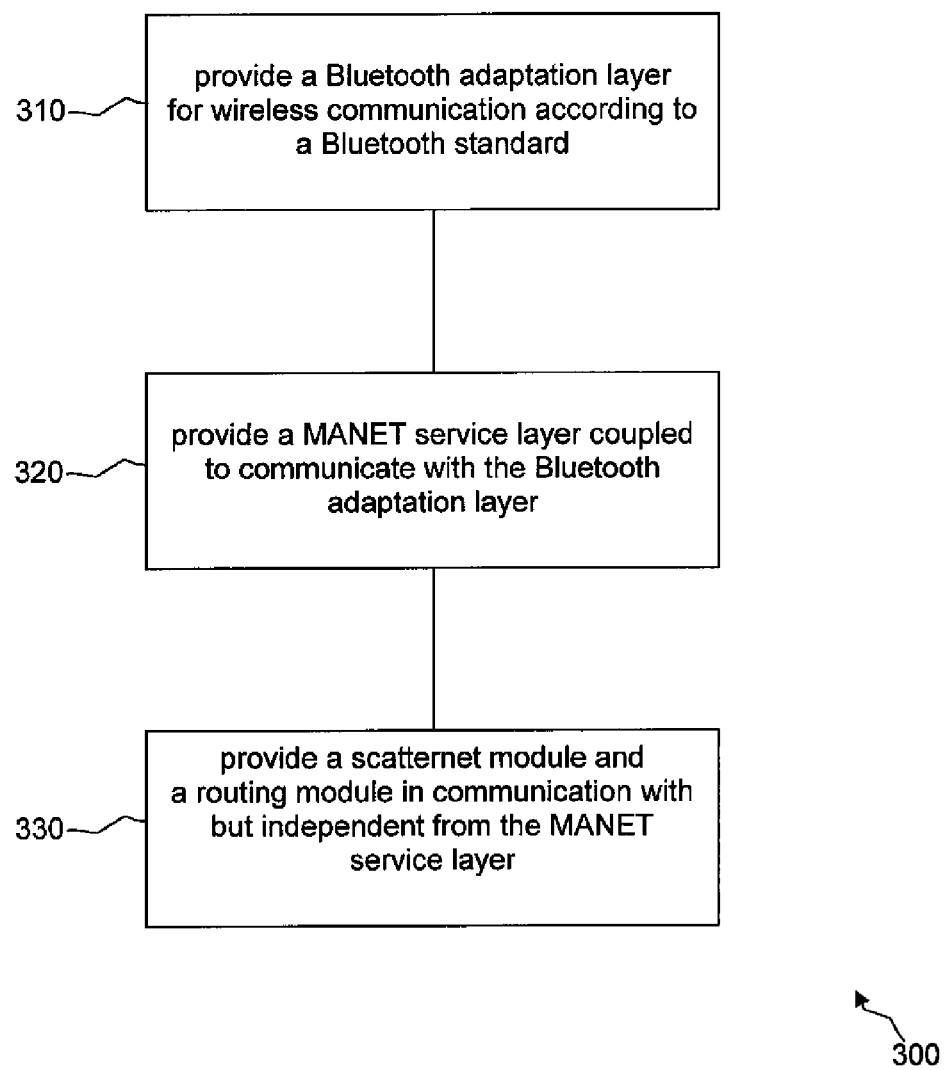
FIG. 2 is a diagram of a method for MANET over Bluetooth according to an embodiment of the disclosure.

FIG. 2 illustrates a method 300 for MANET over Bluetooth. At block 310, a Bluetooth adaptation layer is provided for wireless communication according to a Bluetooth standard. At block 320, a MANET service layer coupled to communicate with the Bluetooth adaptation layer is provided. At block 330, a scatternet module and a routing module are provided. The scatternet module and the routing module are in communication with but independent from the MAN ET service layer.

Figure 3:
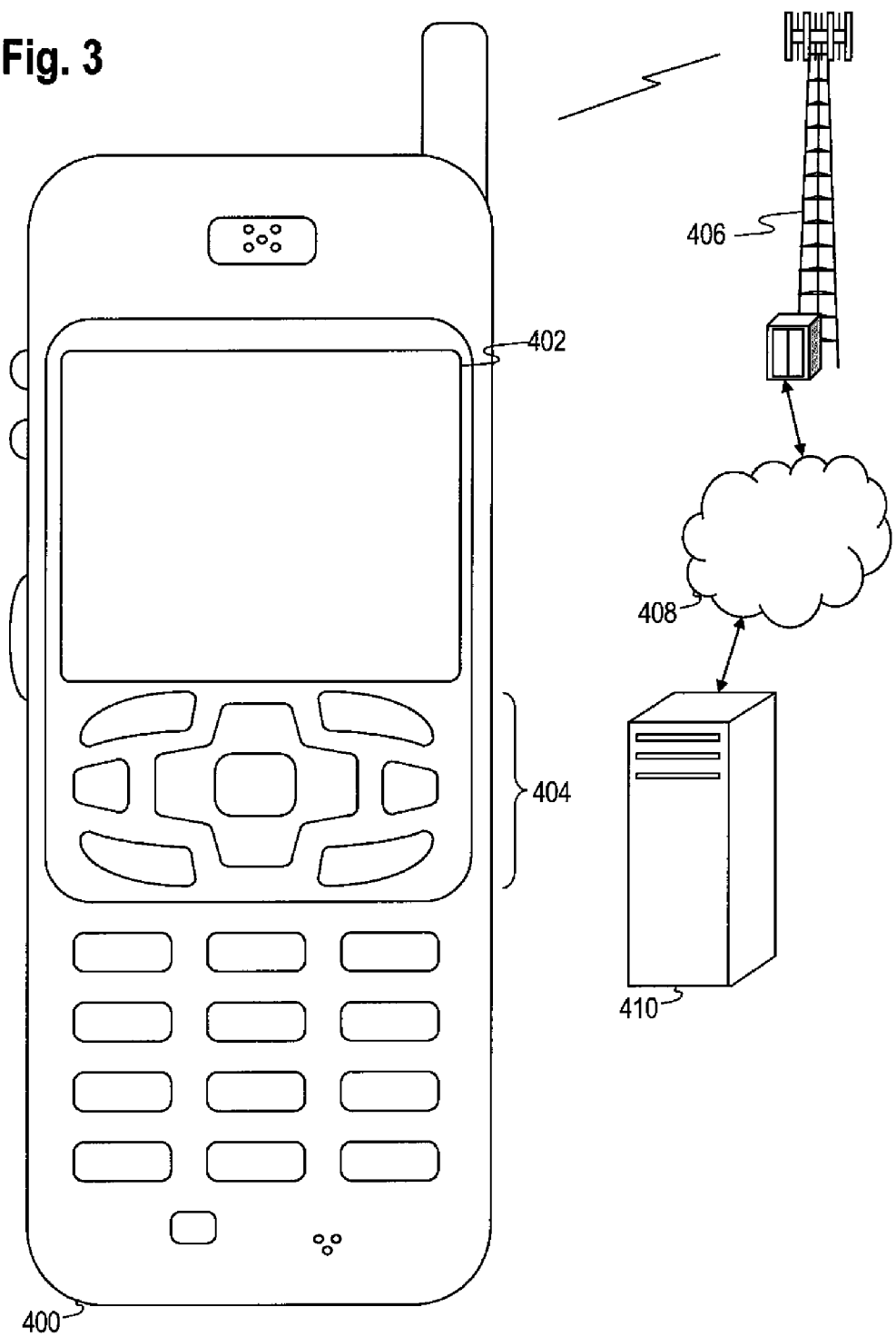
FIG. 3 is a diagram of a wireless communications system including a handset operable for some of the various embodiments of the disclosure.

FIG. 3 shows a wireless communications system including a handset 400 that may be operable for implementing aspects of the present disclosure, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset 400. The handset 400 may further execute one or more software or firmware applications in response to user commands. These applications may configure the handset 400 to perform various customized functions in response to user interaction.

Among the various applications executable by the handset 400 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402.

Figure 4:
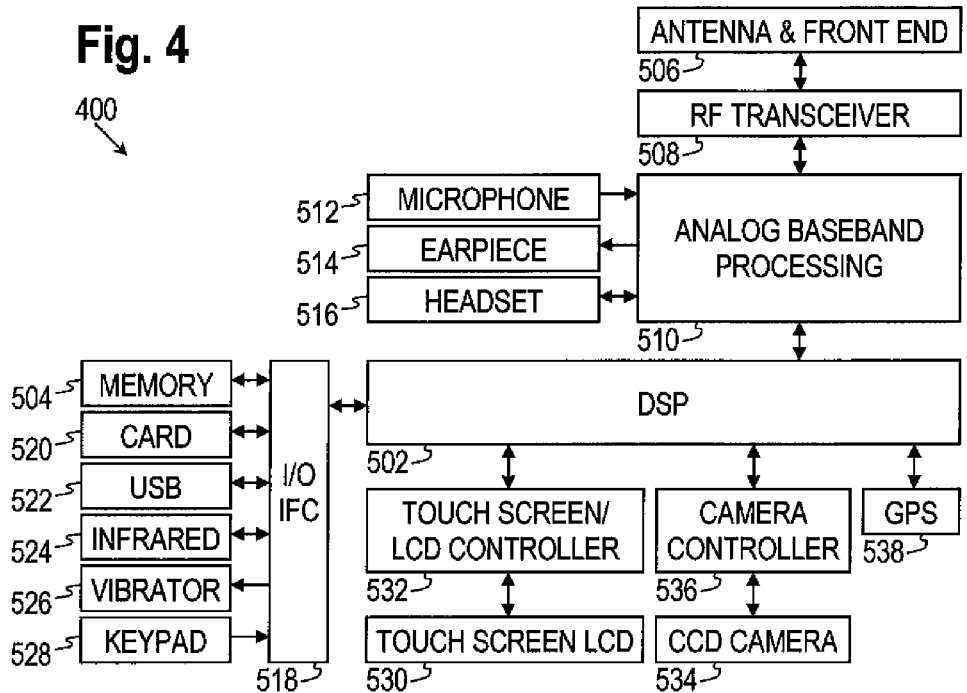
FIG. 4 is a block diagram of a handset operable for some of the various embodiments of the disclosure.

FIG. 4 shows a block diagram of the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. Various other peripherals may also be included to provide additional functions, e.g., radio and television reception.

Figure 5:
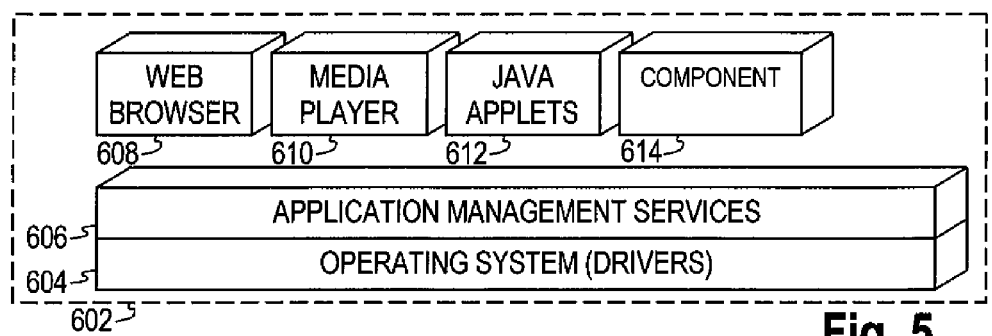
FIG. 5 is a diagram of a software environment that may be implemented on a handset operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 5 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality. A component 614 might provide functionality related to transmitting and receiving data packets in a scatternet.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobile ad hoc network (MANET) device having an architecture comprising:

a Bluetooth adaptation layer configured for wireless communication according to a Bluetooth convention;
a MANET service layer;
a scatternet module configured to form a connection topology for devices in a scatternet using a topology protocol;
a routing module configured to determine paths that data packets will use when exchanged between the devices in the scatternet using routing rules;
a flow control manager in the MANET service layer configured to control a flow of data in the scatternet; and
a Bluetooth adaptation layer service access point between the Bluetooth adaptation layer and the MANET service layer, the Bluetooth adaptation layer service access point configured to handle indications of events received from a Bluetooth host stack including indications of connection or disconnection of devices, indications of discovery of devices, indications of the switching of roles among the MANET device and the discovered devices, and indications of link quality,
wherein the Bluetooth adaptation layer is configured to receive data in a format used by the Bluetooth host stack, convert the received data into a format usable by the MANET service layer, convert the converted received data into an event recognizable by the MANET service layer, and send the event to the MANET service layer,
wherein the MANET service layer is configured to receive and manage the event,
wherein the scatternet module and the routing module are in communication with the MANET service layer, and
wherein the MANET service layer is independent of the topology protocol of the scatternet module and independent of the routing rules of the routing module.

2. The MANET device of claim 1, wherein the MANET service layer is configured to communicate with the scatternet module when the scatternet module employs a first topology protocol and when the scatternet module employs a second topology protocol.

3. The MANET device of claim 1, wherein the MANET service layer is configured to communicate with the routing module when the routing module employs first routing rules and when the routing module employs second routing rules.

4. The MANET device of claim 1, wherein the flow control manager is configured to employ one of a first flow control protocol and a second flow control protocol.

5. The MANET device of claim 1, wherein the MANET service layer includes a connection manager configured to manage connection-related functions and a data manager configured to manage data-related functions.

6. The MANET device of claim 5 further comprising:
the Bluetooth host stack configured to communicate via a particular Bluetooth convention, the Bluetooth host stack configured to communicate with the Bluetooth adaptation layer.

7. The MANET device of claim 6, wherein the Bluetooth adaptation layer is further configured to insulate the MANET service layer from the Bluetooth host stack such that the MANET service layer, the scatternet module, and the routing module do not need to be modified when a different Bluetooth host stack communicating via a different Bluetooth convention is employed.

8. A mobile ad hoc network (MANET) device having an architecture comprising:
a Bluetooth adaptation layer configured for wireless communication according to a Bluetooth convention;
a MANET service layer comprising a flow control manager configured to control a flow of data in a scatternet and a data manager;
a Bluetooth MANET core comprising a scatternet module configured to form a connection topology for devices in the scatternet using a topology protocol and a routing module configured to determine paths that data packets will use when exchanged between the devices in the scatternet using routing rules; and
a Bluetooth adaptation layer service access point between the Bluetooth adaptation layer and the MANET service layer, the Bluetooth adaptation layer service access point configured to handle indications of events received from a Bluetooth host stack including indications of connection or disconnection of devices, indications of discovery of devices, indications of the switching of roles among the MANET device and the discovered devices, and indications of link quality,
wherein the Bluetooth adaptation layer is configured to receive data in a format used by the Bluetooth host stack, convert the received data into a format usable by the MANET service layer, convert the converted received data into an event recognizable by the MANET service layer, and send the event to the MANET service layer,
wherein the MANET service layer is configured to receive and manage the event,
wherein the scatternet module and the routing module are in communication with the MANET service layer, and
wherein the MANET service layer is independent of the topology protocol of the scatternet module and independent of the routing rules of the routing module.

9. The MANET device of claim 8, wherein the MANET service layer is configured to communicate with the scatternet module when the scatternet module employs a first topology protocol and when the scatternet module employs a second topology protocol.

10. The MANET device of claim 8, wherein the MANET service layer is configured to communicate with the routing module when the routing module employs first routing rules and when the routing module employs second routing rules.

11. The MANET device of claim 8, wherein the flow control manager is configured to employ one of a first flow control protocol and a second flow control protocol.

12. The MANET device of claim 8, wherein the MANET service layer further includes a connection manager configured to manage connection-related functions.

13. The MANET device of claim 12 further comprising:
the Bluetooth host stack configured to communicate via a particular Bluetooth convention, the Bluetooth host stack configured to communicate with the Bluetooth adaptation layer.

14. The MANET device of claim 13, wherein the Bluetooth adaptation layer is further configured to insulate the MANET service layer from the Bluetooth host stack such that the MANET service layer, the scatternet module, and the routing module do not need to be modified when a different Bluetooth host stack communicating via a different Bluetooth convention is employed.

15. A mobile ad hoc network (MANET) comprising a plurality of MANET devices, each MANET device having an architecture comprising:
a Bluetooth adaptation layer configured for wireless communication according to a Bluetooth convention;
a MANET service layer comprising a flow control manager configured to control a flow of data in a scatternet and a data manager;
a Bluetooth MANET core comprising a scatternet module configured to form a connection topology for devices in the scatternet using a topology protocol and a routing module configured to determine paths that data packets will use when exchanged between the devices in the scatternet using routing rules; and a Bluetooth adaptation layer service access point between the Bluetooth adaptation layer and the MANET service layer, the Bluetooth adaptation layer service access point configured to handle indications of events received from a Bluetooth host stack including indications of connection or disconnection of devices, indications of discovery of devices, indications of the switching of roles among the MANET device and the discovered devices, and indications of link quality, wherein the Bluetooth adaptation layer is configured to receive data in a format used by the Bluetooth host stack, convert the received data into a format usable by the MANET service layer, convert the converted received data into an event recognizable by the MANET service layer, and send the event to the MANET service layer, wherein the MANET service layer is configured to receive and manage the event, wherein the scatternet module and the routing module are in communication with the MANET service layer, and wherein the MANET service layer is independent of the topology protocol of the scatternet module and independent of the routing rules of the routing module.

16. The MANET of claim 15, wherein the MANET service layer of each MANET device is configured to communicate with the scatternet module when the scatternet module employs a first topology protocol and when the scatternet module employs a second topology protocol.

17. The MANET of claim 15, wherein the MANET service layer of each MANET device is configured to communicate with the routing module when the routing module employs first routing rules and when the routing module employs second routing rules.

18. The MANET of claim 15, wherein the flow control manager is configured to employ one of a first flow control protocol and a second flow control protocol.

19. The MANET of claim 18, each MANET device further comprising the Bluetooth host stack configured to communicate via a particular Bluetooth convention, the Bluetooth host stack configured to communicate with the Bluetooth adaptation layer.

20. The MANET of claim 19, wherein the Bluetooth adaptation layer is further configured to insulate the MANET service layer from the Bluetooth host stack such that the MANET service layer, the scatternet module, and the routing module do not need to be modified when a different Bluetooth host stack communicating via a different Bluetooth convention is employed.

* * * * *